United States Patent

Stark et al.

[15] 3,645,352
[45] Feb. 29, 1972

[54] ANTICREEP BRAKE SYSTEM FOR A WHEELED VEHICLE

[72] Inventors: Clarence C. Stark, Plymouth; Carlos M. Barrera, Detroit, both of Mich.

[73] Assignee: Ford Motor Company, Dearborn, Mich.

[22] Filed: June 22, 1970

[21] Appl. No.: 48,066

[52] U.S. Cl. ............................................180/82, 303/21 CF
[51] Int. Cl. .........................................................B60t 7/12
[58] Field of Search ...............180/82; 192/3, 4, 13; 188/181, 188/110; 303/21

[56] References Cited

UNITED STATES PATENTS

| | | | |
|---|---|---|---|
| 3,233,153 | 1/1966 | Ryan | 180/82 X |
| 2,573,196 | 10/1951 | Harmon | 192/3 |
| 3,184,606 | 5/1965 | Ovenden et al. | 317/5 X |
| 3,455,411 | 7/1969 | Carp et al. | 180/105 |
| 3,498,426 | 3/1970 | Nakano | 192/13 |
| 3,563,611 | 2/1971 | Sharp | 303/21 |

Primary Examiner—Kenneth H. Betts
Attorney—John R. Faulkner and Donald J. Harrington

[57] ABSTRACT

An automatic, creep control brake system for a wheeled vehicle having fluid pressure operated brakes including a valve in the pressure line for the vehicle wheel brakes which retains driver developed brake pressure while the vehicle is stationary, and an electronic control system responsive to wheel speed, brake pedal application and throttle movement to control the pressure retaining valve so that the wheel braking pressure is relieved automatically while the vehicle is operating under normal operating conditions and to apply anticreep braking pressure automatically after the vehicle is brought to a stop by the wheel brakes.

14 Claims, 4 Drawing Figures

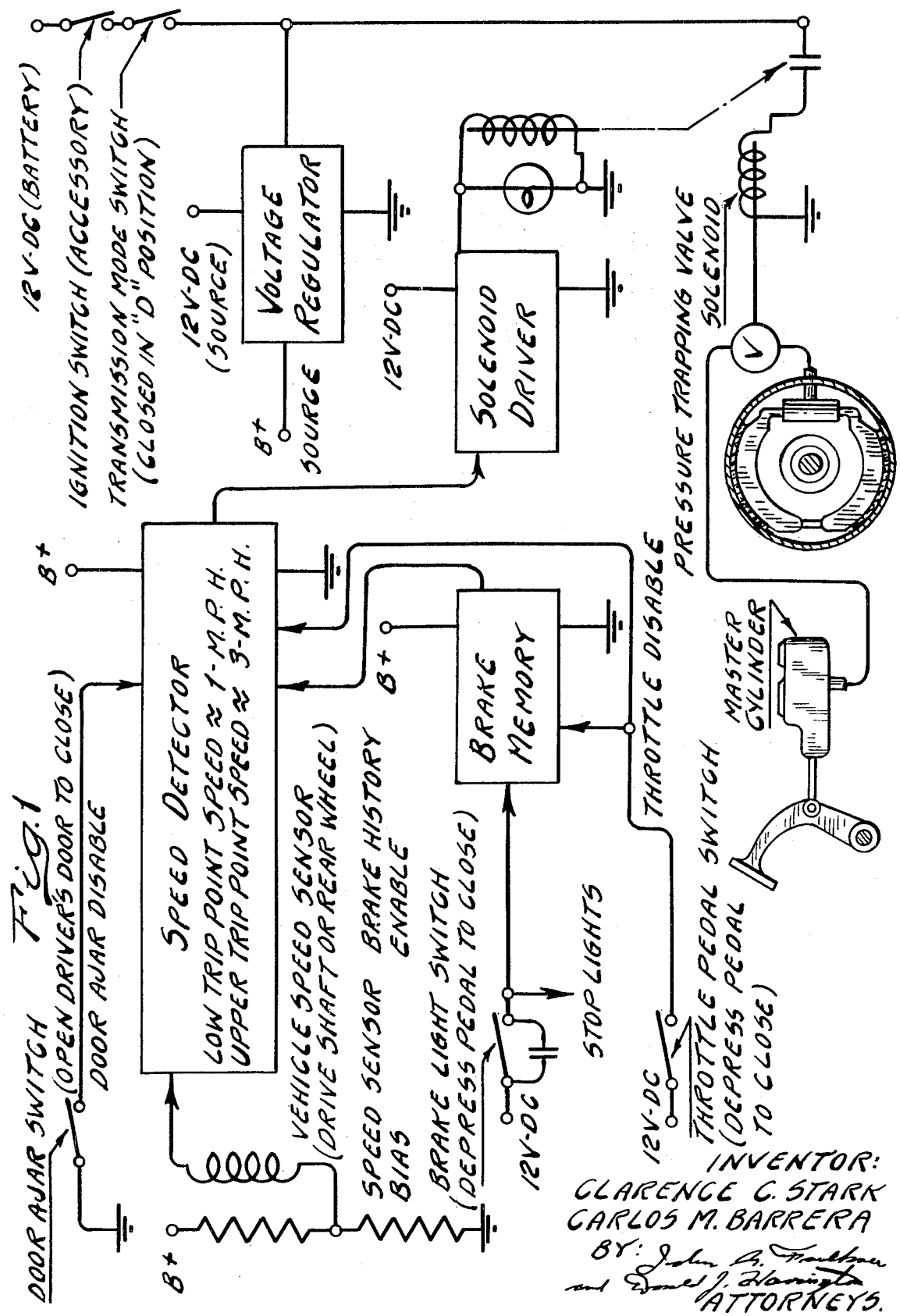

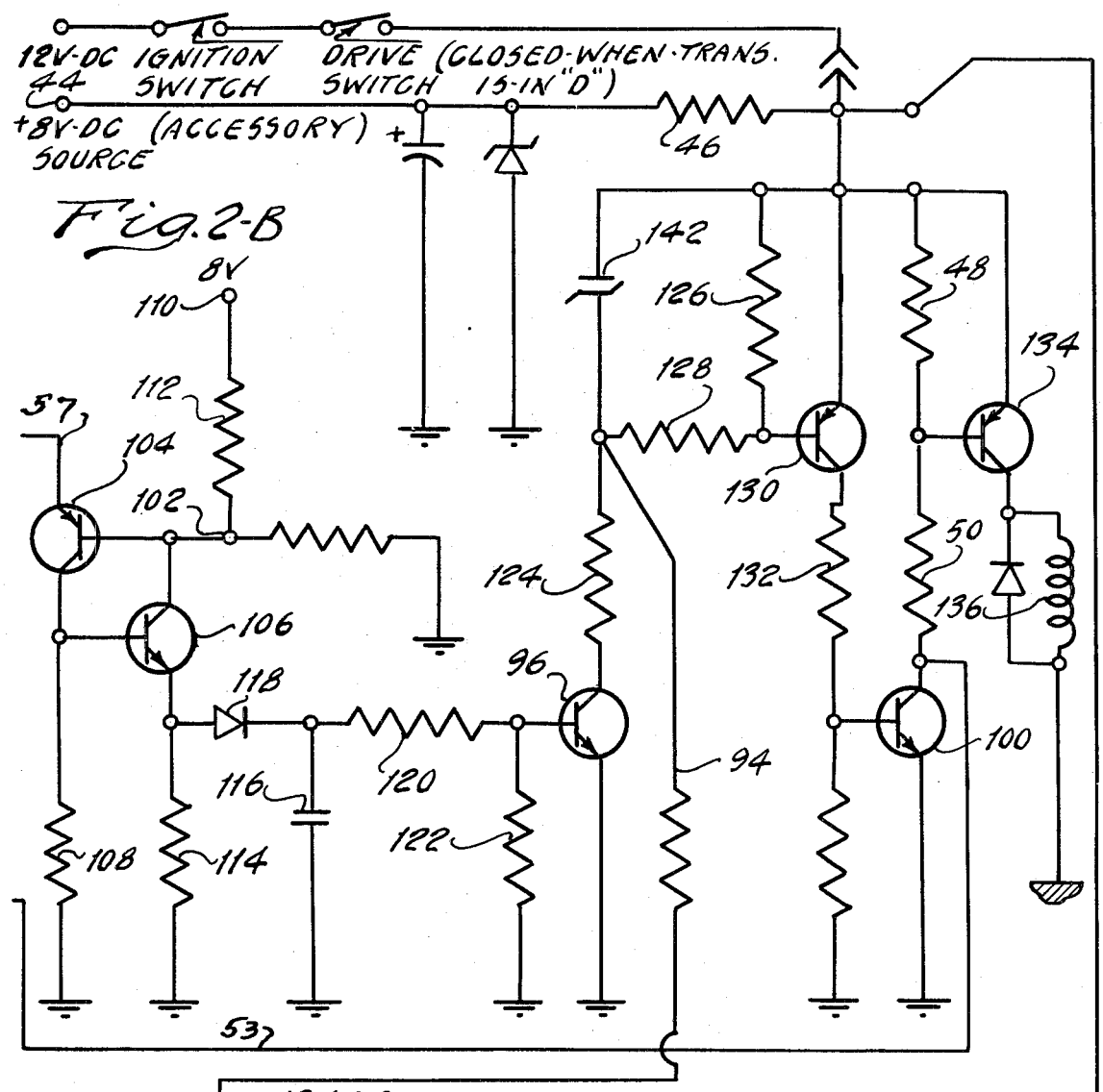
Fig.2-B
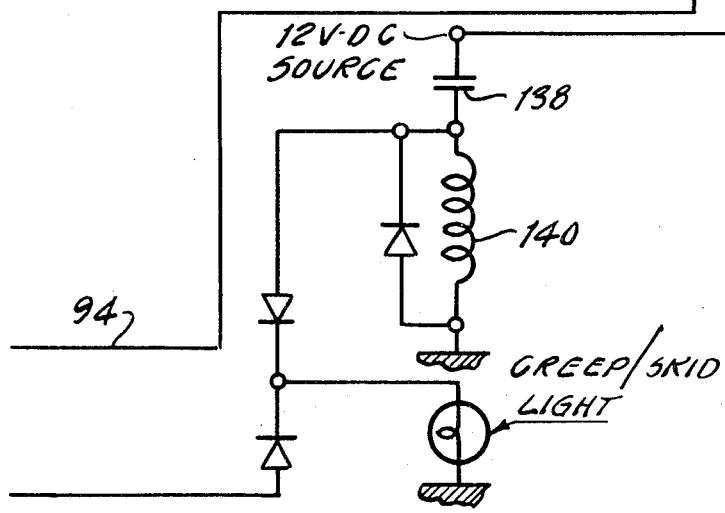

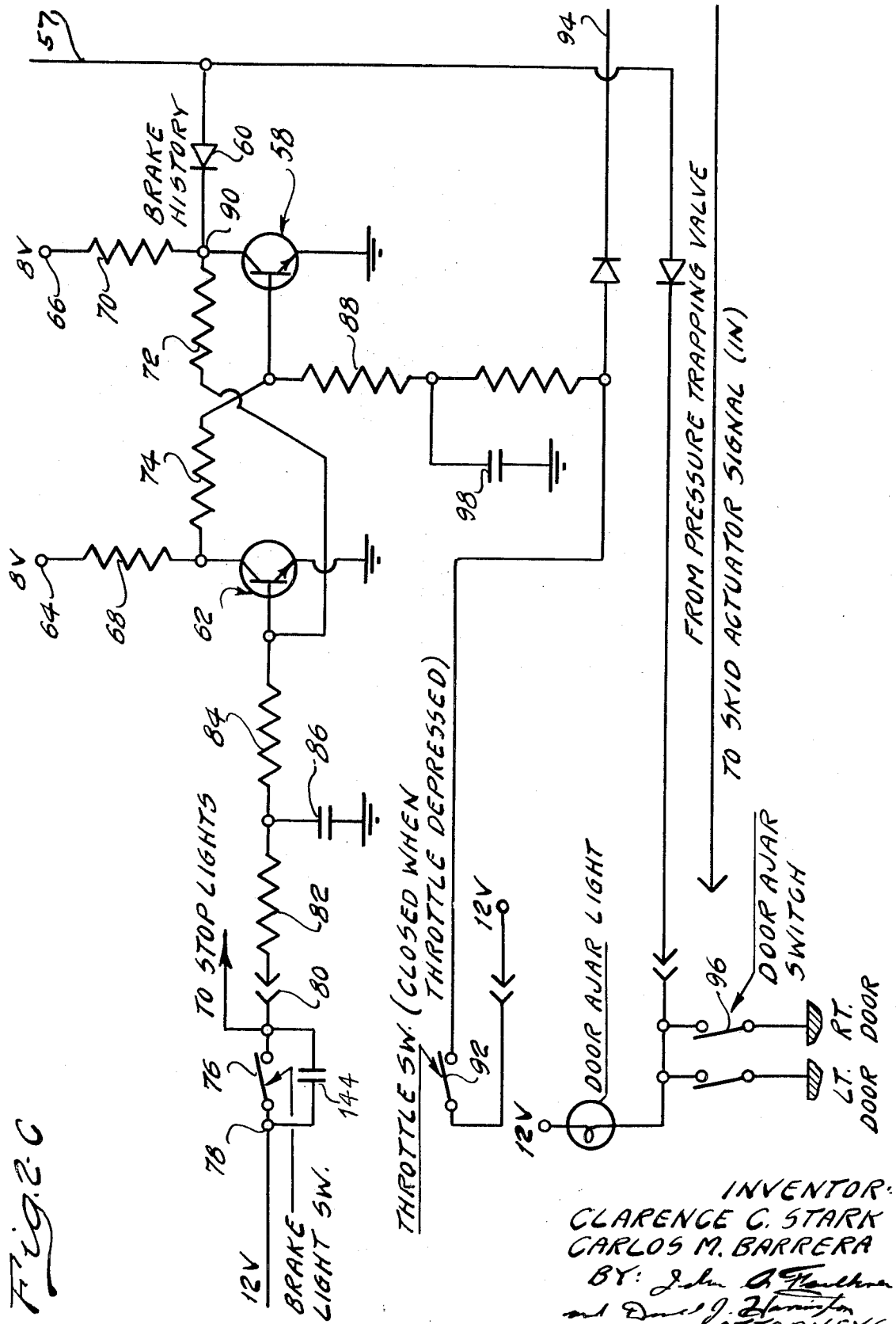

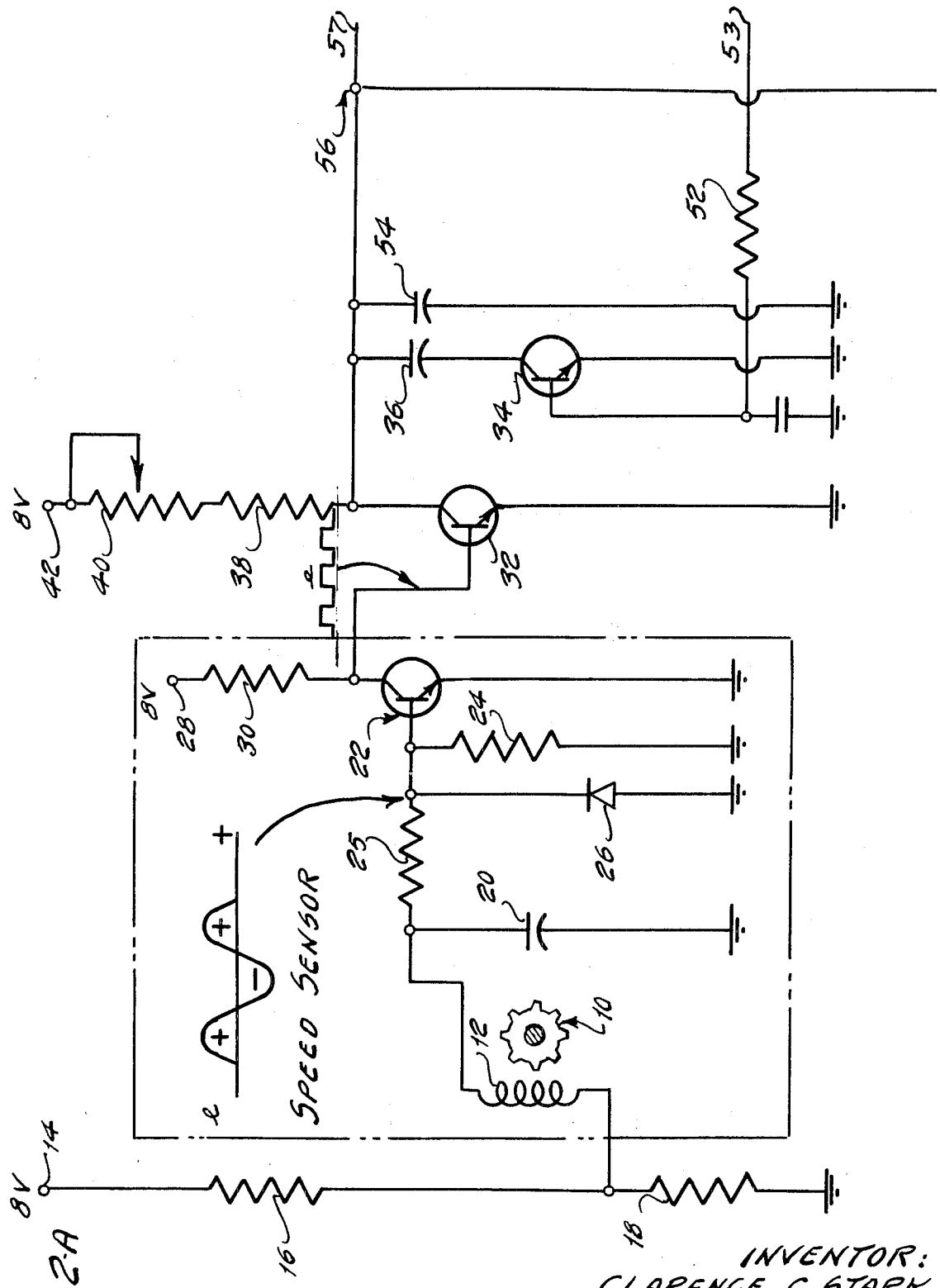

ANTICREEP BRAKE SYSTEM FOR A WHEELED VEHICLE

GENERAL DESCRIPTION OF THE INVENTION

The improvements of our invention may be applied to a vehicle with fluid pressure operated wheel brakes. It includes an automatic, anticreep brake control circuit which causes a residual wheel brake pressure to be retained after the vehicle has been brought to a stop following braking. Vehicle motion, when the vehicle is in a rest condition, is referred no normally as vehicle creep. This is caused by gravitational pull when the vehicle is stopped on a road grade. It is caused also by the presence of a forward drive torque in the torque converter of an automatic transmission in those instances when the vehicle driveline is equipped with an automatic transmission.

A speed sensor in the system develops a speed signal that is proportional in frequency to the speed of the rearward drive wheels. This signal and a brake signal developed by the application of the vehicle wheel brakes, as well as a throttle pedal position signal which is developed when the engine throttle is open, are used to control the operation of a solenoid valve situated in series in the front wheel brakelines thereby trapping driver developed pressure until the solenoid valve is deenergized. The trapping valve will retain in the front wheel brakes the highest pressure generated by the driver after the various signals actuate the solenoid valve.

The circuitry for the anticreep brake system provides a low-speed trip point and an upper speed trip point at which the anticreep brake system is actuated. The lower speed trip point is the speed at which the brake system is actuated as the vehicle decelerates to a rest condition. The upper speed trip point is the speed at which the anticreep brake system is released during acceleration of the rear wheels. If the vehicle speed is equal to or below the lower speed trip point, the pressure trapping valve will be actuated provided the driver decelerates the vehicle by pressing on the brake pedal. Brake pressure is released quickly by depressing the accelerator pedal, preferably during movement of the pedal through its pretravel. In order to reapply the anticreep brake system, a new brake command must be applied by the vehicle operator and the vehicle speed must be below the low-speed trip point.

Opening the driver's door temporarily disengages the creep control system.

Acceleration of the vehicle above the upper trip point speed will disengage the creep control regardless of the throttle position. Presence of the two trip points is of an advantage when the vehicle is operated on a surface having a low coefficient of friction where the drive wheels tend to assume a locked-up condition or the vehicle wheel brakes are applied. The locked-up condition is avoided while the vehicle velocity tends to go to zero.

It is possible with a conventional antiskid brake system for the locked-up condition to be achieved at a high speed below which the antiskid brake system will be actuated. The creep control then will be actuated even though anticreep braking pressure is not desired. In our improved anticreep brake system, however, the rear drive wheels are accelerated as soon as the driver releases the brake pedal and the rear wheels then accelerate past the upper trip point speed to release quickly the front wheel brakeline pressure trapping valve.

If the driver should park the vehicle on a road grade or if the vehicle should have any unduly high engine idle speed, it is possible that the trapped brake pressure will be insufficient to hold the vehicle against creep. The vehicle then will tend to accelerate, but the creep control system will not be released until the upper trip point speed is reached. This feature allows sufficient time for the driver to notice the lack of pressure in the wheel brakes and to reapply the larger braking pressure to prevent further vehicle motion.

During parking, the anticreep brake system will not be actuated unless the vehicle speed is less than the lower trip point speed. The driver than is not inconvenienced during such parking maneuvers. Further it is possible to allow the vehicle to creep at low-vehicle speeds during operation in heavy traffic even though the vehicle speed at that time is less than the lower trip point speed. The anticreep brake system will not be actuated under these conditions unless the brakes are actuated by the vehicle operator.

BRIEF DESCRIPTION OF THE FIGURES OF THE DRAWING

FIG. 1 shows in schematic, block-diagram form the circuit elements of our improved anticreep brake system.

FIGS. 2A, 2B and 2C show an electronic circuit diagram having the principal elements of our anticreep brake system.

PARTICULAR DESCRIPTION OF THE INVENTION

We have shown at 10 in FIG. 2A a speed sensor comprising a rotor which is connected drivably to the rear traction wheels of a wheeled vehicle. The rotor carries metal teeth or lugs which traverse the magnetic flux field of an inductance coil 12. One side of the coil 12 is connected to an 8-volt source 14 through a control resistor 16. Resistor 16 on the input side of the inductance coil 12 is connected to ground through a bias resistor 18.

When the rear vehicle wheels rotate, rotor 10 is driven thereby inducing a sinusoidal voltage at the output side of the coil 12. This voltage is applied to one side of capacitor 20, the other side of which is grounded.

An amplifier transistor 22 has its base connected to the output side of the inductance coil 12 through resistor 25. A high ohm resistor 24 is connected between the base of transistor 22 and the ground to establish a base-emitter voltage bias. The emitter for the transistor 22 is grounded as shown.

A diode 26, which has an internal impedance of approximately the same value as the impedance of the transistor 22, is situated in parallel disposition with respect to the resistor 24. This limits the value of the negative voltage signals at the base of transistor 22 to the conducting diode voltage drop.

When the base of transistor 22 receives a positive voltage signal, the collector circuit conducts. The circuit includes a voltage source 28 and resistor 30. The voltage drop across resistor 30 is a square wave signal, as shown, which is distributed to the base of transistor 32. This transistor acts as a switch for the speed detector, and the circuit of which it is a part may be referred to as a switching circuit means.

The speed detector includes transistor 34 having a collector which is connected through capacitor 36 to the collector circuit for transistor 32. This latter circuit includes control resistors 38 and 40 which connect the collector for transistor 32 to an eight volt source 42. The emitter for transistor 34 is grounded. The base for transistor 34 is connected to the collector of transistor 100 which controls the state of transistor 34.

This turns the transistor 34 on thereby grounding the capacitor 36. A second capacitor 54 is connected in parallel relationship with respect to capacitor 36, one side being connected to the collector circuit for transistor 32 and the other side being grounded.

When transistor 32 is conducting, both capacitors 36 and 54 are grounded. When transistor 32 is off, the 8 volt source 42 for capacitors 36 and 54 will cause a charge to develop in the capacitors. The time required to establish any given charge depends upon the charging time constant for resistors 38 and 40 and the capacitors. There is a definite charge-time relationship. When the frequency of the input voltage signal distributed to the base of transistor 32 is relatively high, capacitors 36 and 54 do not have sufficient time to develop a voltage which will cause the speed detector to be triggered. If the frequency of the input voltage signal distributed to the base of transistor 32 is relatively low, capacitors 36 and 54 are able to develop a large charge. The speed at which the triggering voltage is developed in the tandem capacitors 36 and 54 is called the lower trip point speed. If the speed detector is actuated and transistor 100 is turned on, a voltage decrease will be experienced on the base of transistor 34. This will be explained subsequently with reference to the circuit drawing for the speed detector. As this occurs, the transistor 34 stops conducting. The capacitor 36 then is effectively removed from the circuit so that only capacitor 54 remains. This changes the charging time constant to the value equal to the resistance of resistors 38 and 40 multiplied by the capacitance of capacitor 54. The charging time constant that existed when transistor 34 was conducting is about three times the charging time constant that existed when it was not conducting and is equal to the value of the resistance of resistors 38 and 40 multiplied by the sum of the values for the capacitances of capacitors 36 and 54.

The voltage applied to the capacitors 36 and 54 appears at the point 56 in emitter circuit 57. The capacitors are grounded through transistor 32 whenever the latter is on, and they are grounded also because of the direct connection between point 56 and the ground through transistor 58 whenever the latter is on.

Transistor 58 includes a collector circuit which is connected directly to point 56 through a rectifying diode 60. Transistor 58 forms one element of a bistable, multivibrator, flip-flop circuit. The companion element for transistor 58 is transistor 62, which is off whenever transistor 58 is on and vice versa. Each collector for the transistors 62 and 58 is connected to an 8-volt source, as shown at 64 and 66. The collector circuits include resistors 68 and 70, respectively. The collector for transistor 58 is connected to the base for transistor 62 through resistor 72 and the collector for transistor 62 is connected to the base for transistor 58 through resistor 74.

Normally transistor 58 is on. A direct connection to ground then exists from point 56 through the diode 60 and through transistor 58. Thus it is impossible at this time for the capacitors 36 and 54 to develop a charge regardless of whether transistor 32 is on or off. As soon as the operator of the vehicle depresses the brakes, switch 76 leading to the brake light circuit is closed. This connects the base of transistor 62 to a 12 volt supply voltage, as shown at 78. This connection is established through connector 80 and controlled by resistors 82 and 84. The 12 volt control voltage is applied also to filter capacitor 86, which is connected between the resistors 82 and 84 and helps to maintain a bias on the base of the transistor 62 once the brakes have been applied thereby making it possible for the speed detector to become actuated when the vehicle wheel speed falls below the lower trip point.

As soon as transistor 62 begins to conduct, a voltage drop occurs across resistor 68. This reduces the base-emitter voltage bias on transistor 58 thereby causing transistor 58 to stop conducting. The voltage at point 90 then immediately rises thus providing a reverse bias on diode 60. This same voltage is applied to the base of transistor 62 thereby allowing the transistor 62 to continue to conduct regardless of whether the switch at 76 is open subsequently.

If the vehicle operator depresses the engine throttle, switch 92 closes. This connects the base for transistor 58 to the 12 volt supply voltage source. This introduces again a positive bias on the transistor 58 which causes collector current again to flow through the collector circuit for transistor 58. This again causes a reduction in the voltage at point 90 and a sudden reduction therefore in the base emitter voltage for transistor 62. This causes transistor 62 to stop conducting as transistor 58 again is turned on. As soon as transistor 58 continues to conduct, point 56 becomes grounded thereby dissipating any charge that may have been accumulated in either one or both of the capacitors 36 or 54.

Point 56 may be connected to ground also through a door ajar switch 96. This switch is closed whenever one of the vehicle doors is open thereby making it impossible for the capacitors 36 and 54 to develop a charge. Thus it is impossible for the anticreep brake system to be actuated when a door is ajar.

Capacitor 98, which is connected to the base of transistor 58, serves the same purpose as capacitor 86 with respect to the transistor 62. It serves to maintain a voltage bias on the base of transistor 58.

If the brakes are applied and the transistor 58 stops conducting while the vehicle is still in motion, a charge will tend to accumulate in capacitors 36 and 54. The charging of these capacitors occurs during the half cycle of the input frequency that turns transistor 32 off, and it is discharged during the interval of half cycle of the input frequency that turns transistor 32 on.

Transistor 34 is on whenever transistor 100 is off, and vice versa. Transistor 100, which will be explained subsequently, forms a part of the speed detector circuit. If it is on, a voltage drop occurs between the voltage source 44 and the base of transistor 34 through resistors 48 and 50. This voltage drop is sufficient to relieve the base emitter voltage bias on transistor 34 thereby turning it off. If we assume that initially transistor 34 is on, the charging time constant is the resistance of resistors 38 and 40 multiplied by the sum of the capacities for capacitors 36 and 54. For frequencies that are higher than the trip point frequencies, the half cycle time with transistor 32 is off too short to allow capacitors 36 and 54 to reach the reference voltage at point 102 before the next half cycle is reached where transistor 32 is on, at which time the capacitors 36 and 54 become discharged through transistor 32.

The point 56 is connected to the emitter circuit 57 for transistor 104. The collector for transistor 104 is connected to the base of companion transistor 106. Both of these transistors form a so-called programable unijunction transistor. The collector for transistor 104 and the base for transistor 106 are grounded through resistor 108.

If the voltage at point 56 develops to a value approximately equal to or greater than the reference voltage at point 102, transistor 104 will be driven to saturation causing a voltage drop across resistor 108. This triggers the transistor 106 causing collector current to rapidly flow from capacitors 36 and 54 through transistors 104 and 106 developing a voltage pulse across resistor 114. This charges the capacitor 116 because the output side of transistor 106 is connected through diode 118 to one side of the capacitor 116.

The signal received by the capacitor 116 is sensed by the base of transistor 96. The presence of the capacitor 116 serves to stretch out or lengthen the pulse signal received through the diode 118 so that a firm bias is maintained on the base of transistor 96. Resistor 120 controls the discharge time for capacitor 116 with a discharge path through the base to the emitter junction of transistor 96. As this occurs, the resulting base-emitter bias for transistor 96 will cause collector current to flow through resistor 124. The collector circuit includes also a resistor 126 and 128. Whenever transistor 96 is turned on in this fashion, a base-emitter voltage bias is produced on transistor 130, causing collector current to flow through resistor 132. This in turn produces a bias on transistor 100 which causes the collector current to flow through resistor 50 and through the transistor 100. This triggers the operation of another transistor 134 since a voltage drop occurs across resistor 48 whenever transistor 100 is conducting. The resulting base-emitter bias on transistor 134 causes collector current to flow through relay coil 136. This triggers the operation of relay contacts 138 and 144 causing current to flow through pressure trapping valve coil 140. This causes the pressure trapping valve to isolate the pressurized brake fluid in the wheel brake cylinders thus maintaining the brakes applied regardless of whether the operator moves his foot from the brake pedal. Of course this occurs only if the vehicle wheel speed is less than the trip point speed at which the speed detector is actuated. Relay contacts 144 provide a current path around the manually operated brake light switch to energize the vehicle brake lights during anticreep operation.

Capacitor 142 is situated in parallel relationship with respect to resistor 126. This tends to stretch out the signal applied to the base of transistor 130 regardless of whether transistor 96 is kept on.

As soon as the throttle is opened and switch 92 is closed, the 12 volt supply voltage is distributed through line 94 to discharge capacitor 142 and turn off reverse bias transistor 130, as well as transistor 100. This then turns off transistor 134 and deactivates the relay coil 136.

If it is assumed that the vehicle is operating at a relatively high speed and the operator applies the brakes, the vehicle will slow down thereby increasing the charging time for the capacitors 36 and 54. If the wheel speed is sufficiently low to cause an input frequency that is low enough to allow the capacitors 36 and 54 to reach their reference voltage at point 102 before the half cycle is reached in which transistor 32 is on, the lower trip point occurs. Transistors 104 and 106 immediately are turned on, producing a pulse into resistor 114 which is stretched by capacitor 116. This pulse is amplified by transistor 96 and further stretched by capacitor 142 turning on the transistors 130, 100 and 134. The long time constant for resistor 128 and capacitor 142 keeps the transistors 130, 100 and 134 on between successive pulses received from transistors 104 and 106.

The amplitude of the speed sensor decreases as the vehicle speed approaches zero. The time constant at that time, which is equal to the resistance of resistor 128 multiplied by the capacitance of capacitor 142, is long enough to keep the creep control signal on down to the lowest frequency for which the amplitude of the sinusoidal wave is large enough to produce the square wave input that drives transistor 32 off and on. At speeds below that value the transistor 32 stays off. At that time resistor 38 and capacitors 36 and 54 act as an oscillator producing a pulse every time the capacitors charge to the reference voltage at point 102. The creep signal then is maintained by keeping the power amplifier output stages on with the help of the pulse stretchers 116 and 142.

At zero wheel speed the base of the transistor 22 is connected to B+ through the bias resistor 16 thus assuring that transistor 22 is on. If for any reason the speed sensor should produce an open circuit, the base emitter voltage bias becomes disconnected from the input amplifier transistor 22 thereby driving transistor 32 on. This grounds the capacitors 36 and 54, as explained previously, thereby preventing the anticreep circuit from operating.

FIG. 1 shows in block diagram form the functions of the circuit of FIGS. 2A and 2B. The speed detector block of the diagram of FIG. 1 includes the transistors 104, 106, 96, 130, 100 and 134. The output of the transistor 134 actuates a switching circuit formed in part by the relay driver 136 and the relay contacts 138 the latter being controlled by the former. The brake memory block in FIG. 1 includes the bistable multivibrator of which the transistors 62 and 58 are a part.

Having thus described a preferred form of our invention what we claim and desire to secure by U.S. Letters Patent is:

1. An anticreep brake system for a wheeled vehicle having fluid pressure operated wheel brakes and a driver operated wheel brake actuator, a hydraulic connection between said actuator and said wheel brakes, a pressure trapping valve in said connection adapted to retain fluid pressure in said wheel brakes, a pressure trapping valve operator, a speed detector circuit electrically connected to said operator, said speed detector circuit forming a connection between a voltage source and said operator and including a switching circuit means for establishing and disestablishing an electrical connection between said source and said operator, a speed sensor means connected drivably to one of said vehicle wheels for developing electrical voltage pulses, a pulse storage capacitor circuit connected to the output side of said speed sensor means and the input side of said switching circuit means, and another switching circuit means for alternately connecting and disconnecting said capacitor to ground in response to the application thereto of said pulse, the input side of said other switching circuit means being connected to voltage source whereby said capacitor is charged and discharged with a frequency that is related to the speed of the vehicle wheels, the magnitude of the charge on said capacitor circuit increasing upon a decrease in wheel speed, said other switching circuit means including a reference voltage source producing a bias tending to maintain said first named switching circuit means in an open circuit condition, the voltage developed in said capacitor circuit opposing said reference voltage and overcoming the reverse bias of said reference voltage when the capacitor voltage reaches a threshold value thereby actuating said first names switching circuit means and triggering the operation of said pressure trapping valve operator.

2. The combination as set forth in claim 1 including a brake memory circuit means for establishing a connection between ground and the capacitor circuit whereby the latter is discharged therethrough when said wheel brakes are deactivated, said brake memory circuit being adapted to respond to application of wheel brakes to interrupt the ground connection through said brake memory circuit for said capacitor circuit.

3. The combination as set forth in claim 2 wherein said first named switching circuit means includes a driver operated throttle switch, one side of said switch being connected to a voltage source and the other side thereof being connected to signal output stages of said first named switching circuit means whereby a reverse bias is distributed to said first named switching circuit means to prevent the development thereby of an output signal when said throttle switch is closed.

4. The combination as set forth in claim 1 wherein said first named switching circuit means includes a driver operated throttle switch, one side of said switch being connected to a voltage source and the other side thereof being connected to signal output stages of said first named switching circuit means whereby a reverse bias is distributed to said first named switching circuit means to prevent the development thereby of an output signal when said throttle switch is closed.

5. An anticreep brake system for a wheeled vehicle having fluid pressure operated wheel brakes and a driver operated wheel brake actuator, a hydraulic connection between said actuator and said wheel brakes, a pressure trapping valve in said connection adapted to retain fluid pressure in said wheel brakes, a pressure trapping valve operator, a speed detector circuit electrically connected to said operator, said speed detector circuit forming a connection between a voltage source and said operator and including a switching circuit means for establishing and disestablishing an electrical connection between said source and said operator, a speed sensor means connected drivably to one of said vehicle wheels for developing electrical voltage pulses, a pulse storage capacitor circuit connected to the output side of said speed sensor means and the input side of said switching circuit means, and another switching circuit means for alternately connecting and disconnecting said capacitor to ground in response to the application thereto of said pulses, the input side of said other switching circuit means being connected to a voltage source whereby said capacitor is charged and discharged with a frequency that is related to the speed of the vehicle wheels, the magnitude of the charge on said capacitor circuit increasing upon a decrease in wheel speed, said capacitor circuit comprising a pair of capacitors situated in parallel relationship and forming a connection between the input side of said first named switching circuit means and ground, the ground connection for one of said capacitors including an electronic switching circuit means adapted to open and close in response to the establishment and disestablishment of a signal for said pressure trapping valve operator, said electronic switching circuit means being connected to the output side of said other switching circuit means.

6. The combination as set forth in claim 5 including a brake memory circuit means for establishing a connection between ground and the capacitor circuit whereby said capacitors are discharged therethrough when said wheel brakes are deactivated, said brake memory circuit being adapted to respond to application of wheel brakes to interrupt the ground connection through said brake member circuit for said capacitor circuit.

7. The combination as set forth in claim 6 wherein said first named switching circuit means includes a driver operated throttle switch, one side of said switch being connected to a voltage source and the other side thereof being connected to signal output stages of said first named switching circuit means whereby a reverse bias is distributed to said first named switching circuit means to prevent the development thereby of an output signal when said throttle switch is closed.

8. The combination as set forth in claim 5 wherein said first named switching circuit means includes a driver operated throttle switch, one side of said switch being connected to a voltage source and the other side thereof being connected to signal output stages of said first named switching circuit means whereby a reverse bias is distributed to said first named switching circuit means to prevent the development thereby of an output signal when said throttle switch is closed.

9. An anticreep brake system for a wheeled vehicle having fluid pressure operated wheel brakes and a driver operated wheel brake actuator, a hydraulic connection between said actuator and said wheel brakes, a pressure trapping valve in said connection adapted to retain fluid pressure in said wheel brakes, a pressure trapping valve operator, a speed detector circuit electrically connected to said operator, said speed detector circuit forming a connection between a voltage source and said operator and including a switching circuit means for establishing and disestablishing an electrical connection between said source and said operator, a speed sensor means connected drivably to one of said vehicle wheels for developing electrical voltage pulses, a pulse storage capacitor circuit connected to the output side of said speed sensor means and the input side of said switching circuit means, and another switching circuit means for alternately connecting and disconnecting said capacitor to ground in response to the application thereto of said pulses, the input side of said other switching circuit means being connected to a voltage source whereby said capacitor is charged and discharged with a frequency that is related to the speed of the vehicle wheels, the magnitude of the charge on said capacitor circuit increasing upon a decrease in wheel speed, said other switching circuit means including a reference voltage source producing a bias tending to maintain said first named switching circuit means in an open circuit condition, the voltage developed in said capacitor circuit opposing said reference voltage and overcoming the reverse bias of said reference voltage when the capacitor voltage reaches a threshold value thereby actuating said first named switching circuit means and triggering the operation of said pressure trapping valve operator, said capacitor circuit comprising a pair of capacitors situated in parallel relationship and forming a connection between the input side of said first named switching circuit means and a ground, the ground connection for one of said capacitors including an electronic switching circuit means adapted to open and close in response to the establishment and disestablishment of a signal for said pressure trapping valve operator, said electronic switching element being connected to the output side of said other switching circuit means.

10. The combination as set forth in claim 9 including a brake memory circuit means for establishing a connection between ground and the capacitor circuit whereby the latter is discharged therethrough when said wheel brakes are deactivated, said brake memory circuit being adapted to respond to application of wheel brakes to interrupt the ground connection through said brake memory circuit for said capacitor circuit.

11. The combination as set forth in claim 10 wherein said first named switching circuit means includes a driver operated throttle switch, one side of said switch being connected to a voltage source and the other side thereof being connected to signal output stages of said first named switching circuit means whereby a reverse bias is distributed to said first named switching circuit means to prevent the development thereby of an output signal when said throttle switch is closed.

12. The combination as set forth in claim 9 wherein said first named switching circuit means includes a driver operated throttle switch, one side of said switch being connected to a voltage source and the other side thereof being connected to signal output stages of said first named switching circuit means whereby a reverse bias is distributed to said first named switching circuit means to prevent the development thereby of an output signal when said throttle switch is closed.

13. An anticreep brake system for a wheeled vehicle having fluid pressure operated wheel brakes and a driver operated wheel brake actuator, a hydraulic connection between said actuator and said wheel brakes, a pressure trapping valve in said connection adapted to retain fluid pressure in said wheel brakes, a pressure trapping valve operator, a speed detector circuit electrically connected to said operator, said speed detector circuit forming a connection between a voltage source and said operator and including a switching circuit means for establishing and disestablishing an electrical connection between said source and said operator, a speed sensor means connected drivably to one of said vehicle wheels for developing electrical voltage pulses, a pulse storage capacitor circuit connected to the output side of said speed sensor means and the input side of said switching circuit means, and another switching circuit means for alternately connecting and disconnecting said capacitor to ground in response to the application thereto of said pulses, the input side of said other switching circuit means being connected to a voltage source whereby said capacitor is charged and discharged with a frequency that is related to the speed of the vehicle wheels, the magnitude of the charge on said capacitor circuit increasing upon a decrease in wheel speed, and a brake memory circuit means for establishing a connection between ground and the capacitor circuit whereby the latter is discharged therethrough when said wheel brakes are deactivated, said brake memory circuit being adapted to respond to application of wheel brakes to interrupt the ground connection through said brake memory circuit for said capacitor circuit.

14. The combination as set forth in claim 13 wherein said first named switching circuit means includes a driver operated throttle switch, one side of said switch being connected to a voltage source and the other side thereof being connected to signal output stages of said first named switching circuit means whereby a reverse bias is distributed to said first named switching circuit means to prevent the development thereby of an output signal when said throttle switch is closed.

* * * * *